(12) United States Patent
Chen

(10) Patent No.: US 9,339,127 B1
(45) Date of Patent: May 17, 2016

(54) HOLDING DEVICE FOR TOOL

(71) Applicant: Chao-Ming Chen, Taichung (TW)

(72) Inventor: Chao-Ming Chen, Taichung (TW)

( * ) Notice: Subject to any disclaimer, the term of this patent is extended or adjusted under 35 U.S.C. 154(b) by 0 days.

(21) Appl. No.: 14/606,030

(22) Filed: Jan. 27, 2015

(51) Int. Cl.
| F16M 11/00 | (2006.01) |
| A47F 5/00 | (2006.01) |
| F16B 2/14 | (2006.01) |
| F16B 2/04 | (2006.01) |
| A47F 7/00 | (2006.01) |

(52) U.S. Cl.
CPC .................. *A47F 5/0006* (2013.01); *A47F 7/00* (2013.01); *F16B 2/04* (2013.01); *F16B 2/14* (2013.01)

(58) Field of Classification Search
CPC ........... A47F 5/0006; A47F 7/00; F16B 2/14; F16B 2/04
USPC .................. 248/314, 682, 689; 206/378, 806; 211/70.6, 113
See application file for complete search history.

(56) References Cited

U.S. PATENT DOCUMENTS

| 6,581,894 B1* | 6/2003 | Tong | A47F 5/0006 206/378 |
| 6,585,210 B1* | 7/2003 | Lee | A47F 9/042 211/69.6 |
| 2002/0130235 A1* | 9/2002 | Tong | A47F 5/0006 248/291.1 |
| 2003/0150824 A1* | 8/2003 | McNeely | B25H 3/003 211/70.6 |
| 2005/0116130 A1* | 6/2005 | Hu | B65D 73/0064 248/309.1 |
| 2005/0230587 A1* | 10/2005 | Yang | B65D 73/0064 248/314 |
| 2007/0034771 A1* | 2/2007 | Liu | A47F 5/0006 248/682 |
| 2007/0194204 A1* | 8/2007 | Chang | A47F 5/0006 248/689 |

* cited by examiner

Primary Examiner — Gwendolyn Baxter

(57) ABSTRACT

A holding device for a tool contains a body, a base, and a limiting mechanism. The body includes an accommodating chamber, a side lid for covering the accommodating chamber, and at least one stop extension extend outwardly from a bottom end of the body. The base includes a fitting seat, at least one locking tab disposed on two sides of the fitting seat and movably corresponding to the at least one stop extension, and a driving insertion arranged on a top end of the fitting seat and inserting into the accommodating chamber. The limiting mechanism includes a confining block connecting with the driving insertion and includes a limitation groove defined on the side lid of the body. The limitation groove has a limiting section formed therein and has an expansion section formed on an open segment of the limiting section.

10 Claims, 19 Drawing Sheets

HOLDING DEVICE FOR TOOL

FIELD OF THE INVENTION

The present invention relates to a holding device for a tool which is operated by user's one hand easily.

BACKGROUND OF THE INVENTION

Referring to FIGS. 1 to 3, a conventional displaying device for a socket tool is disclosed in U.S. Pat. No. 6,581,894 and contains a holder 10 and a display member 20. The holder 10 includes a hollowly rectangular seat 11, and the rectangular seat 11 has a boss 111 disposed on an outer wall thereof and has two slits 112 defined beside the boss 111, such that the boss 111 flexibly retracts inward. The rectangular seat 11 also has a fitting section 12 arranged on a top end thereof, and the fitting section 12 has an accommodating cavity 121 defined therein and has a slot 122 formed on a bottom end of the accommodating cavity 121. The display member 20 includes a hanging plate 21, a connector 22 connecting with a bottom end of the hanging plate 21, and a driving piece 23 extending downwardly from a bottom end of the connector 22, wherein the driving piece 23 has a fringe 231 for engaging with or disengaging from the boss 111 of the rectangular seat 11, such that the driving piece 23 of the display member 20 is inserted into the rectangular seat 11 from the slot 122 of the fitting section 12 of the holder 10, and the connector 22 of the display member 20 is fitted with the accommodating cavity 121 of the fitting section 12. In operation, as shown in FIG. 2, the display member 20 is rotated so that the fringe 231 of the driving piece 23 disengages from the boss 111 of the rectangular seat 11, and then the boss 111 of the rectangular seat 11 flexibly retracts inward, the rectangular seat 11 is fitted with a fitting orifice of the socket tool, thereafter the boss 111 of the rectangular seat 11 engages with a notch of the fitting orifice of the socket tool. As illustrated in FIG. 3, after the rectangular seat 11 is fitted into the fitting orifice of the socket tool, the display member 20 is rotated so that the fringe 231 of the driving piece 23 engages with the boss 111 of the rectangular seat 11, and the boss 111 does not flexibly retract inwardly, thus engaging the boss 111 with the notch of the fitting orifice of the socket tool and connecting the socket tool with the rectangular seat 11 securely. However, the displaying device still has disadvantages as follows:

1. After the rectangular seat 11 is fitted into the fitting orifice of the socket tool, the display member 20 is rotated so that the fringe 231 of the accommodating cavity 121 of the fitting section 12 engages with the boss 111 of the rectangular seat 11. However, the display member 20 is rotated by user's two hands troublesomely.

2. When desiring to remove the socket tool from the displaying device, the display member 20 is rotated by the user's two hands so that the fringe 231 of the hanging plate 21 of the display member 20 disengages from the boss 111 of the rectangular seat 11, thus causing complicated operation.

The present invention has arisen to mitigate and/or obviate the afore-described disadvantages.

SUMMARY OF THE INVENTION

The primary objective of the present invention is to provide a holding device for a tool in which a base is pushed reciprocately by user's one hand so that a confining block rotates in and retains with a limiting section of a limitation groove to fit the base with the tool easily.

Another objective of the present invention is to provide a holding device for a tool in which the base is pushed reciprocately by the user's one hand so that the confining block further rotates and moves into the limiting section of the limitation groove to remove the base with the tool easily.

To obtain above-mentioned objectives, a holding device for a tool provided by the present invention contains a body, a base, and a limiting mechanism.

The body includes an accommodating chamber defined therein, a side lid for covering the accommodating chamber, and at least one stop extension extend outwardly from a bottom end of the body.

The base includes a fitting seat, at least one locking tab disposed on two sides of the fitting seat and movably corresponding to the at least one stop extension of the body, and a driving insertion arranged on a top end of the fitting seat and inserting into the accommodating chamber of the body.

The limiting mechanism includes a confining block connecting with the driving insertion of the base, and the limiting mechanism also includes a limitation groove defined on the side lid of the body so that the confining block moves and rotates in the limitation groove. The limitation groove has a limiting section formed therein so that the confining block moves in the limiting section. The limitation groove also has an expansion section formed on an open segment of the limiting section so that the confining block rotates in the expansion section and retains with the open segment of the limiting section, the at least one stop extension of the body engages with the at least one locking tab of the fitting seat of the base or the confining block rotates in the expansion section and moves into the limiting section, hence the at least one stop extension of the body disengages from the at least one locking tab of the fitting seat of the base.

DETAILED DESCRIPTION OF THE PREFERRED EMBODIMENTS

Figure 1:
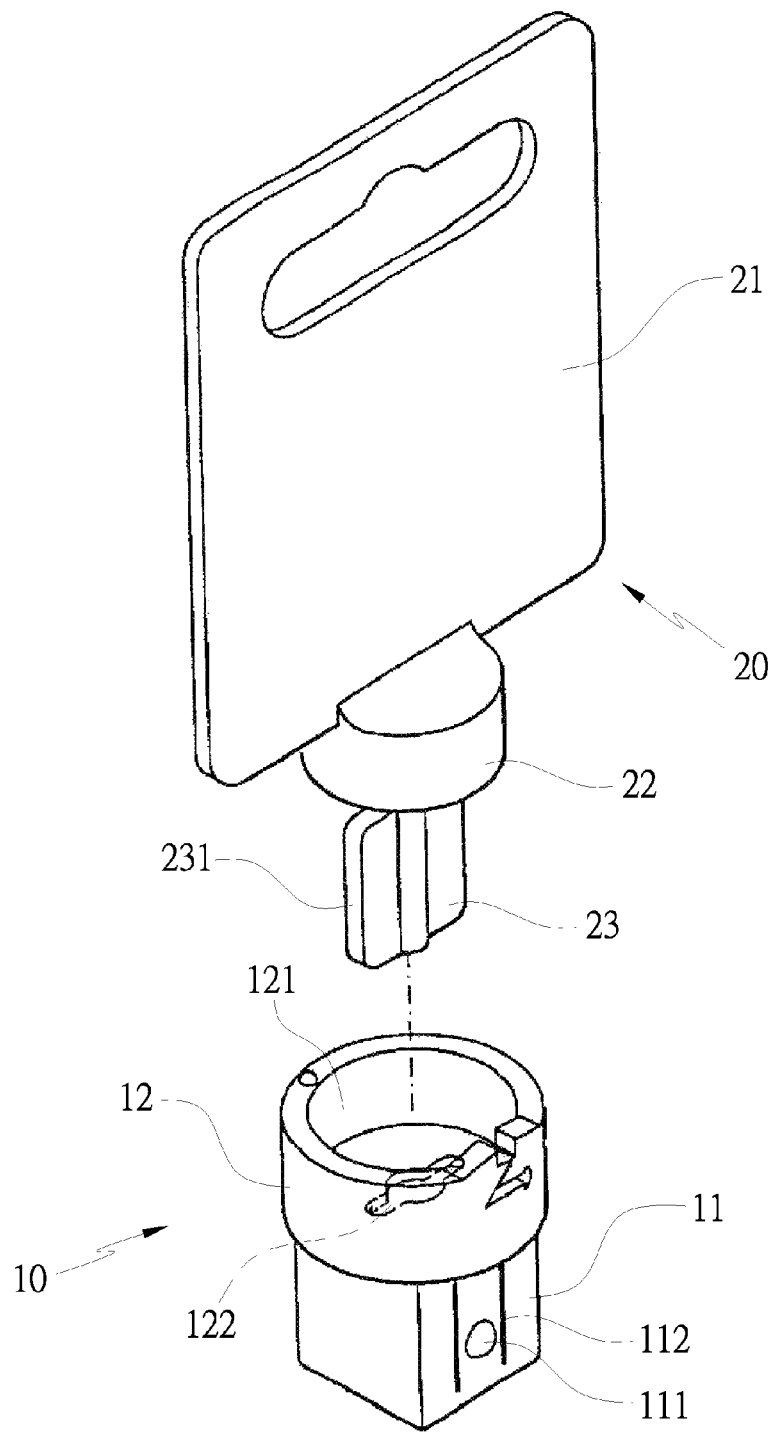
FIG. 1 is a perspective view showing the exploded components of a conventional displaying device for a socket tool.
Figure 2:
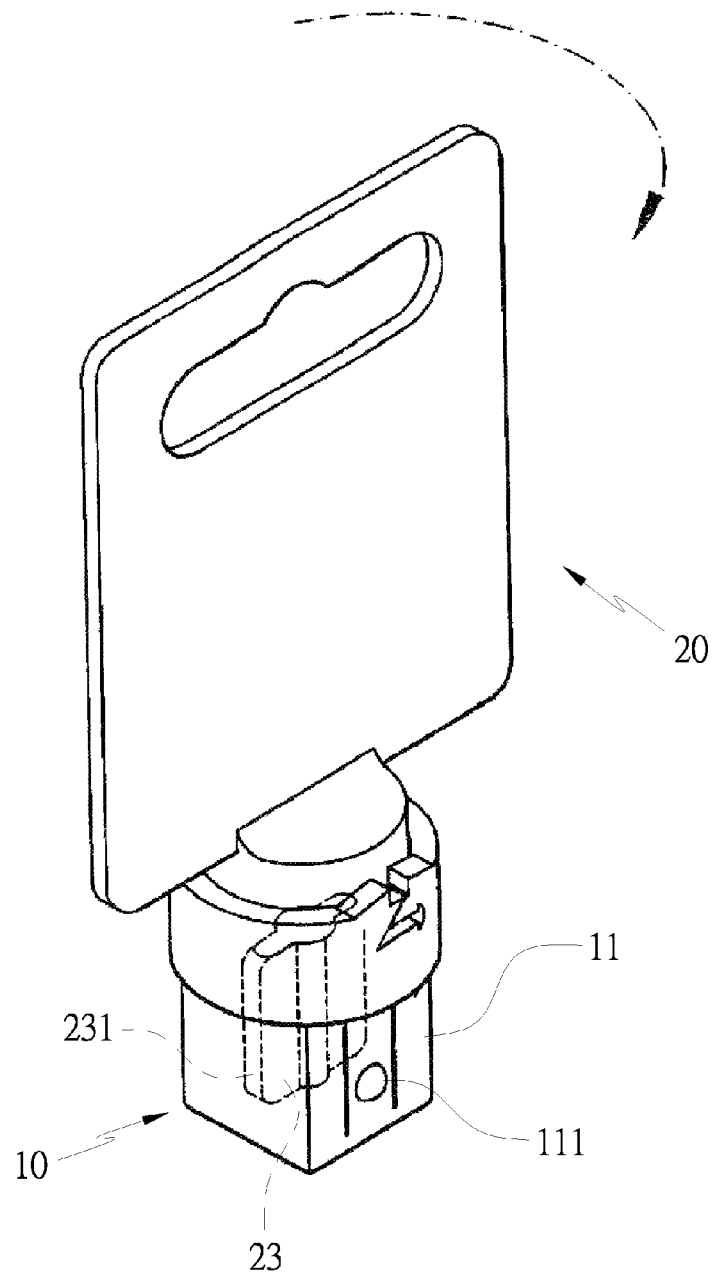
FIG. 2 is a perspective view showing the operation of the conventional displaying device for the socket tool.
Figure 3:
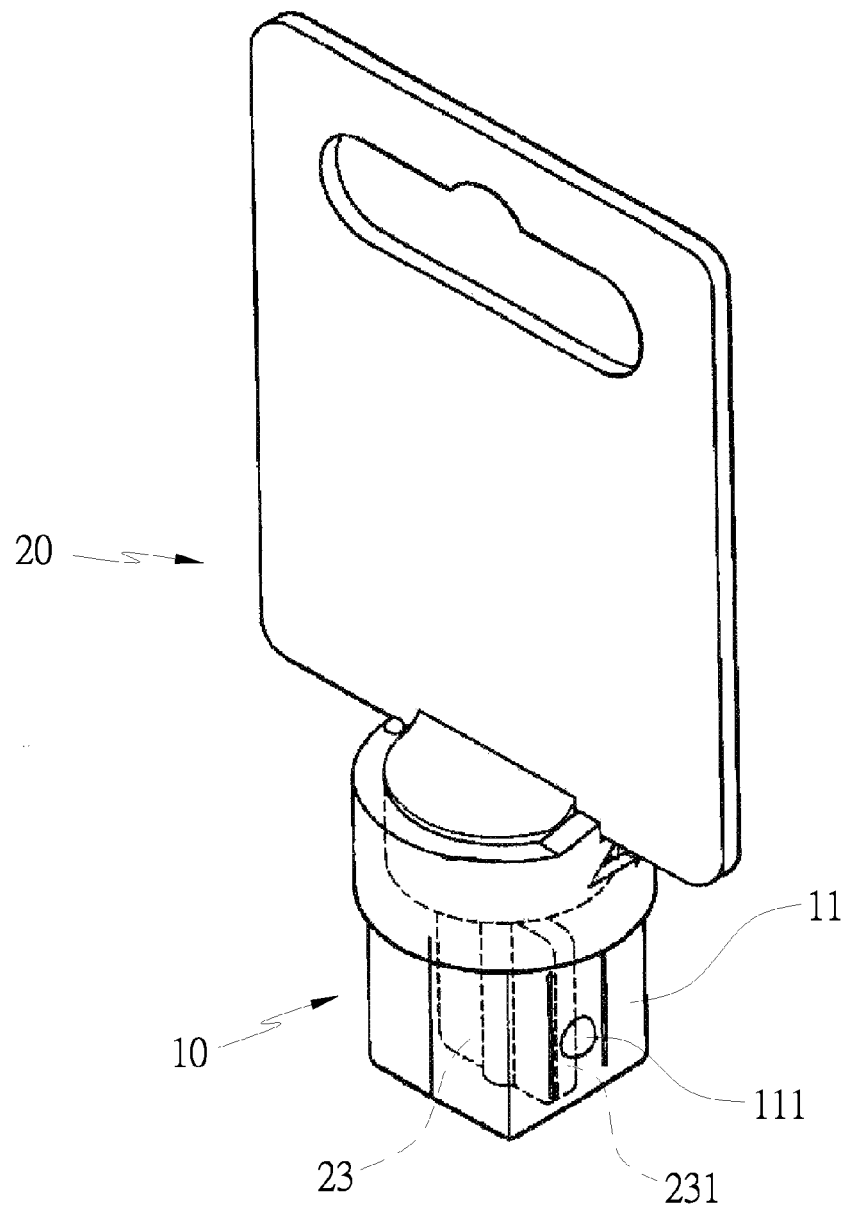
FIG. 3 is another perspective view showing the operation of the conventional displaying device for the socket tool
Figure 4:
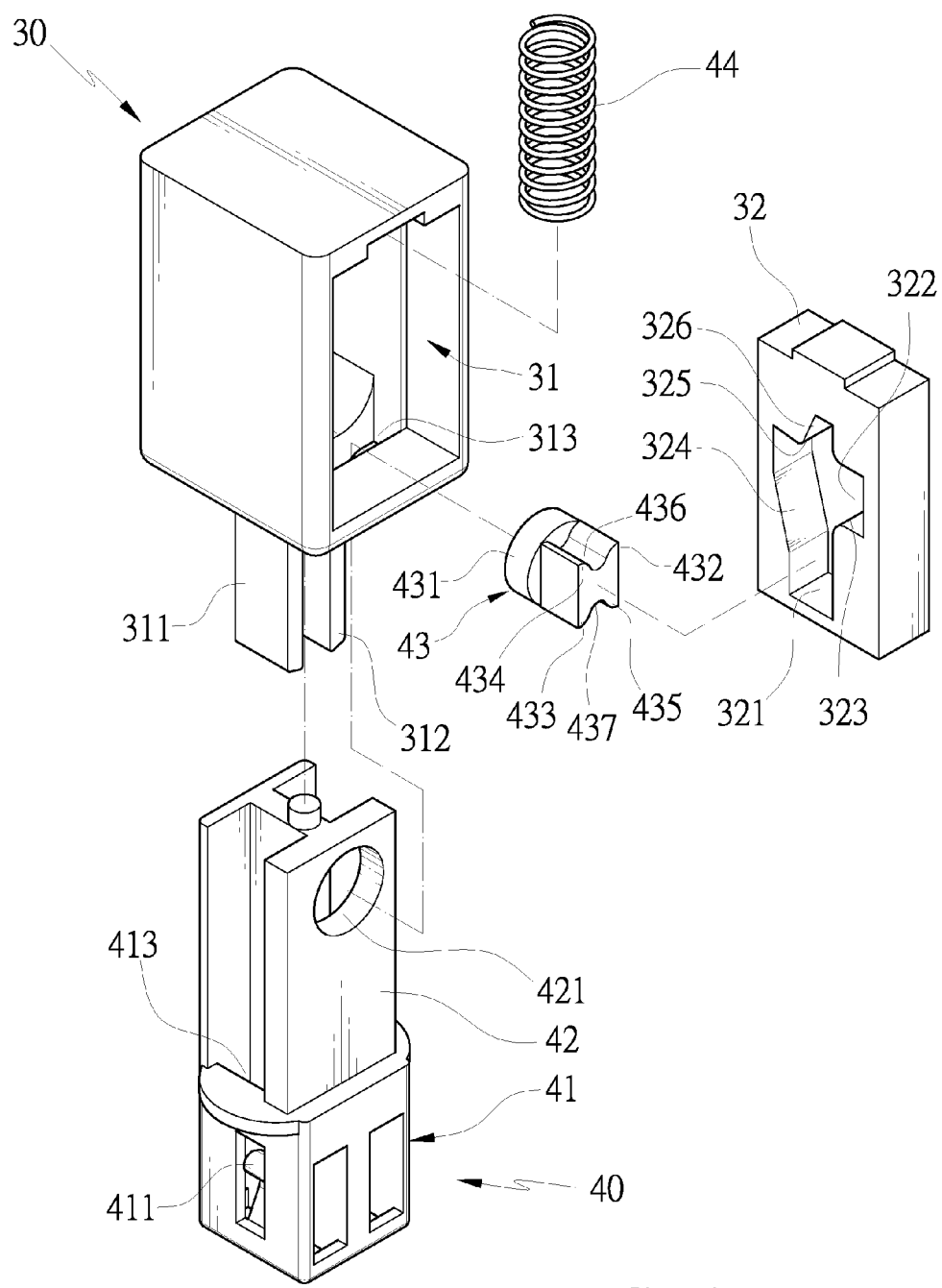
FIG. 4 is a perspective view showing the exploded components of a holding device for a tool according to a preferred embodiment of the present invention.
Figure 5:
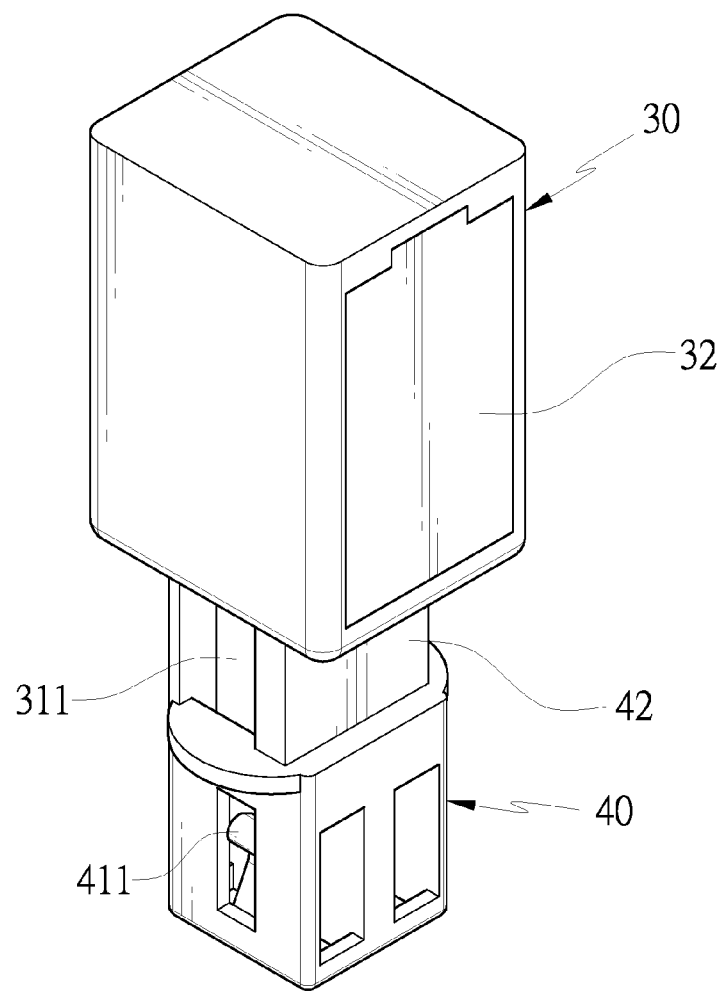
FIG. 5 is a perspective view showing the assembly of the holding device for the tool according to the preferred embodiment of the present invention.
Figure 6:
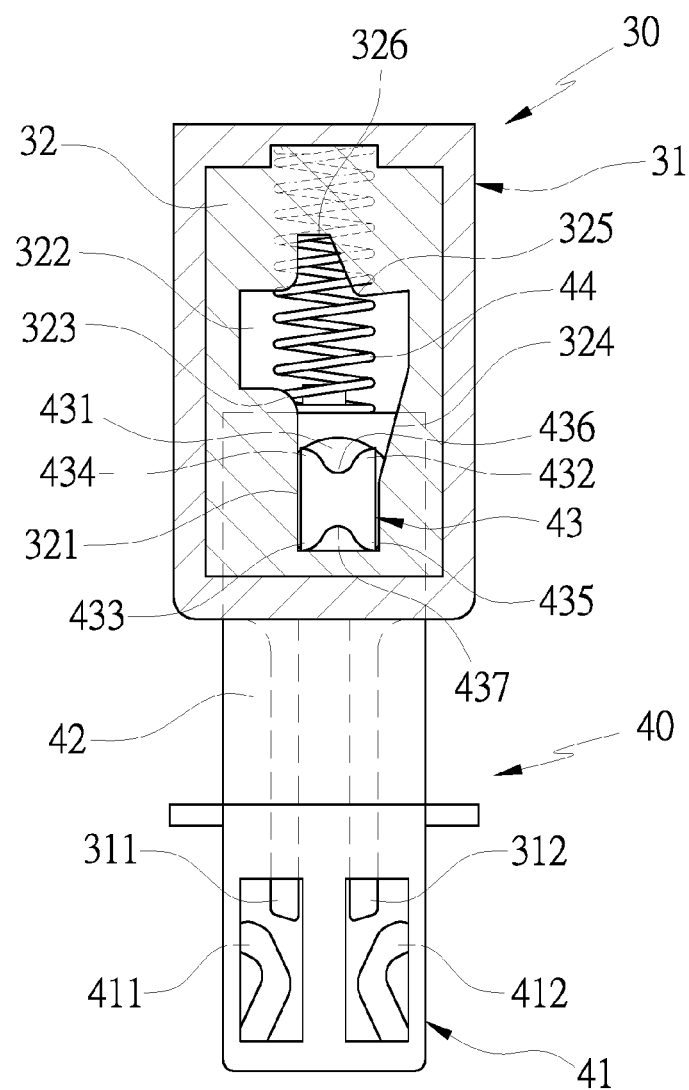
FIG. 6 is a cross sectional view showing the assembly of the holding device for the tool according to the preferred embodiment of the present invention.

With reference to FIGS. 4 to 6, a holding device for a tool according to a preferred embodiment of the present invention comprises: a body 30, a base 40, and a limiting mechanism. The body 30 includes an accommodating chamber 31 defined therein, and the accommodating chamber 31 has an opening formed on one side of the body 30. The body 30 also includes a side lid 32 for covering the opening of the accommodating chamber 31, a first stop extension 311 and a second stop extension 312 which both extend outwardly from a bottom end of the body 30.

The base 40 includes a fitting seat 41 for fitting with a tool and for sliding along the first stop extension 311 and the second stop extension 312 of the body 30. A first locking tab 411 is disposed a first side of the fitting seat 41 and movably corresponding to the first stop extension 311, and a second locking tab 412 mounted on a second side of the fitting seat 41 and movably corresponding to the second stop extension 312, such that when the first stop extension 311 of the body 30 engages with the first locking tab 411, and the second stop extension 312 of the body 30 engages with the second locking tab 412 of the fitting seat 41. The first locking tab 411 and the second locking tab 412 expand outwardly to retain with the tool; when the first locking tab 411 of the fitting seat 41 disengages from the first stop extension 311 of the body 30. The second locking tab 412 of the fitting seat 41 disengages from the second stop extension 312 of the body 30. The first locking tab 411 and the second locking tab 412 retract inwardly to disengage from the tool. In this embodiment, the base 40 also includes two slots 413 formed above the fitting seat 41 to insert the first stop extension 311 and the second stop extension 312 of the body 30. The base 40 further includes a driving insertion 42 arranged on a top end of the fitting seat 41 and inserting into the accommodating chamber 31 of the body 30. In this embodiment, the accommodating chamber 31 of the body 30 has a notch 313 formed on a bottom end thereof so that the driving insertion 42 inserts into the accommodating chamber 31 via the notch 313. A resilient element 44, such as a spring, is defined between a top end of the accommodating chamber 31 and a top end of the driving insertion 42, such that the resilient element 44 pushes the driving insertion 42 by which the fitting seat 41 moves along the first stop extension 311 and the second stop extension 312 of the body 30. The limiting mechanism is defined between the body 30 and the base 40 so that when the base 40 is pushed. The fitting seat 41 fits with the tool or removes from the tool. The limiting mechanism includes a confining block 43 connecting with the driving insertion 42 of the base 40, such that the confining block 43 moves with and rotates on the driving insertion 42 of the base 40. In this embodiment, the driving insertion 42 of the base 40 has an orifice 421 formed thereon, and the confining block 43 has a circular disc 431 arranged thereon and rotatably fixed in the orifice 421 of the driving insertion 42, such that the confining block 43 rotates in the driving insertion 42. The confining block 43 is rectangular and has four protrusions arranged on two diagonal positions thereof. In this embodiment, the confining block 43 has a first protrusion 432 and a second protrusion 433 arranged on a first diagonal position thereof, and the confining block 43 also has a third protrusion 434 and a fourth protrusion 435 arranged on a second diagonal position thereof, wherein between the first protrusion 432 and the third protrusion 434 is defined a first V-shaped recess 436, and between the second protrusion 433 and the fourth protrusion 435 is defined a second V-shaped recess 437. Furthermore, the side lid 32 of the body 30 has a limitation groove defined thereon so that the confining block 43 moves and rotates in the limitation groove. The limitation groove has a limiting section 321 formed therein, wherein the limiting section 321 has a close segment arranged on a first end thereof and an open segment arranged on a second end thereof, and wherein a width of the limiting section 321 is less than a distance between the first protrusion 432 and the second protrusion 433, the width of the limiting section 321 is also less than a distance between the third protrusion 434 and the fourth protrusion 435. The open segment of the limiting section 321 has an expansion section 322 formed thereon so that the confining block 43 rotates in the expansion section 322. On a corner of the expansion section 322 and the limiting section 321 is defined a first shoulder 323, and a second shoulder 324 is arranged in the limitation groove opposite to the first shoulder 323 and has a tilted face defined thereon. The limitation groove also has a pushing projection 325 arranged above the second shoulder 324 to push any one of the first protrusion 432, the second protrusion 433, the third protrusion 434, and the fourth protrusion 435 of the confining block 43. In addition, the limitation groove further has a depression 326 defined between the pushing projection 325 and the expansion section 322 to push and rotate the confining block 43. Thereby, when the fitting seat 41 of the base 40 is pushed reciprocately, i.e., the driving insertion 42 of the base 40 drives the confining block 43 to move out of the limiting section 321 and to rotate in the expansion section 322, the first protrusion 432 of the confining block 43 engages with the first shoulder 323 of the limitation groove, the second protrusion 433 of the confining block 43 engages with the second shoulder 324, hence the confining block 43 does not move into the limiting section 321, and the first stop extension 311 engages with the first locking tab 411, the second stop extension 312 engages with the second locking tab 412, such that the fitting seat 41 of the base 40 fits with the tool. Furthermore, when the confining block 43 keeps rotation in the expansion section 322, it moves into the limiting section 321, such that the first stop extension 311 disengages from the first locking tab 411, and the second stop extension 312 disengages from the second locking tab 412, hence the fitting seat 41 of the base 40 removes from the tool.

Figure 7:
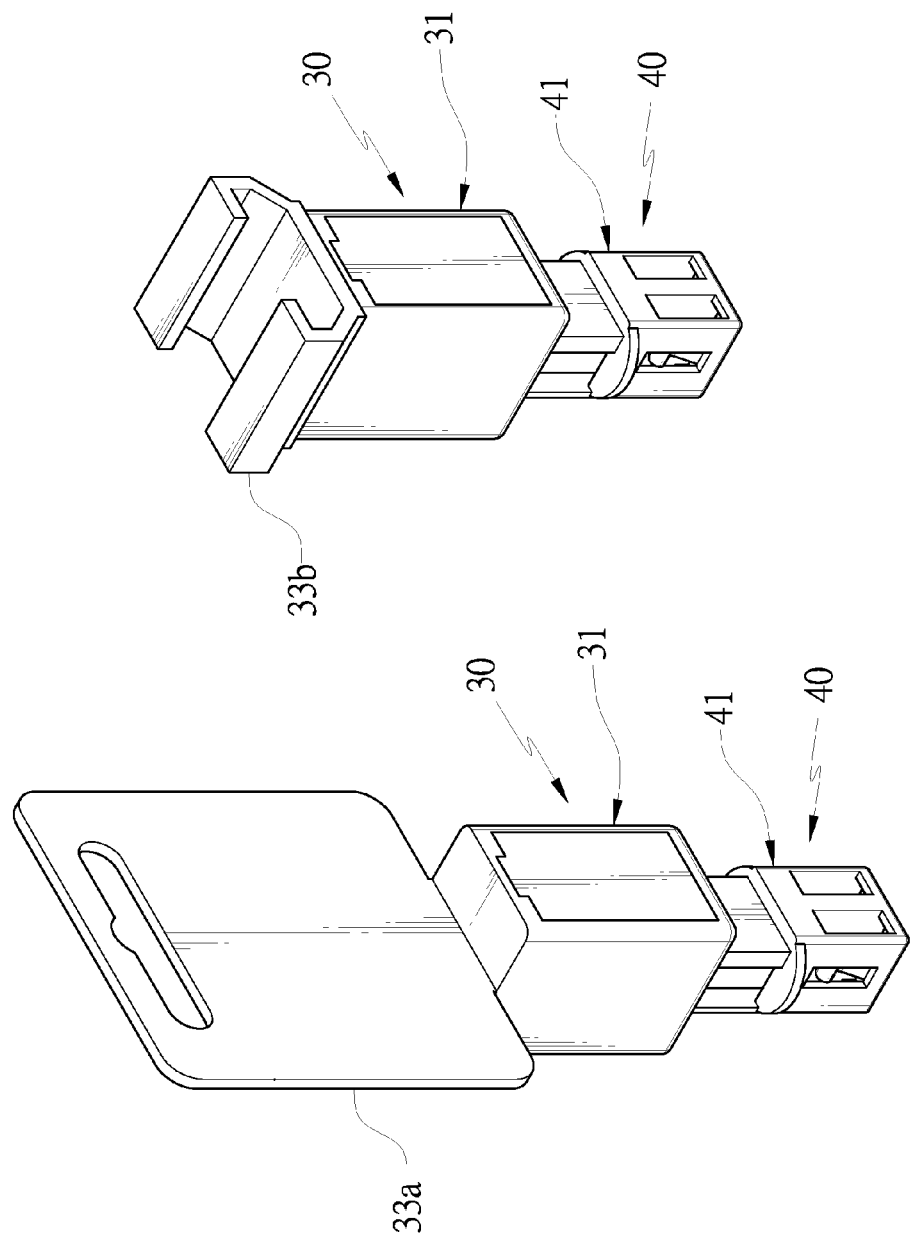
FIG. 7 is a perspective view showing the application of the holding device for the tool according to the preferred embodiment of the present invention.

Referring to FIG. 7, the holding device further comprises a hanging plate 33a or a retaining holder 33b connected with the body 30, such that the fitting seat 41 of the base 40 is fitted with the tool, such as a socket, and the tool is hanged and displayed by ways of the hanging plate 33a or the retaining holder 33b.

Figure 8:
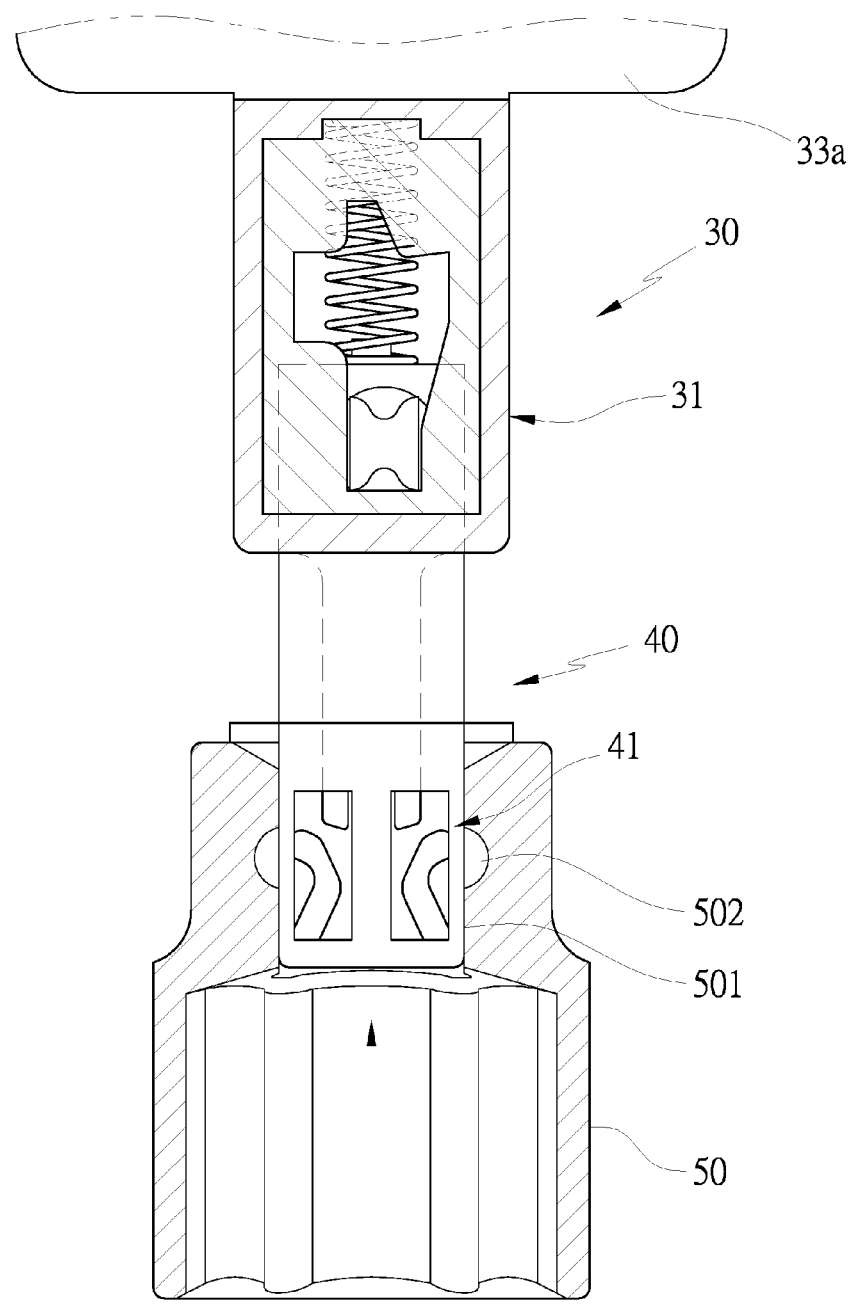
FIGS. 8 to 12 are a cross sectional view showing the operation of the holding device for the tool according to the preferred embodiment of the present invention.
Figure 9:
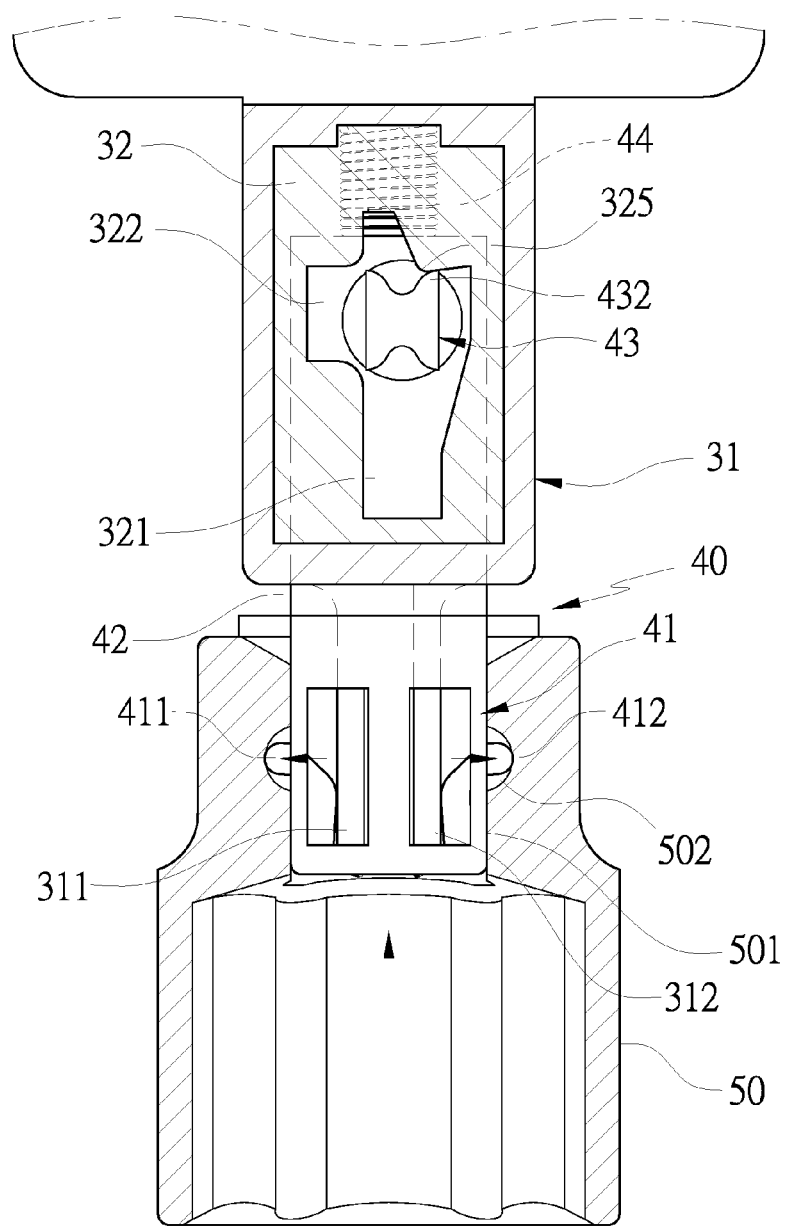
Figure 10:
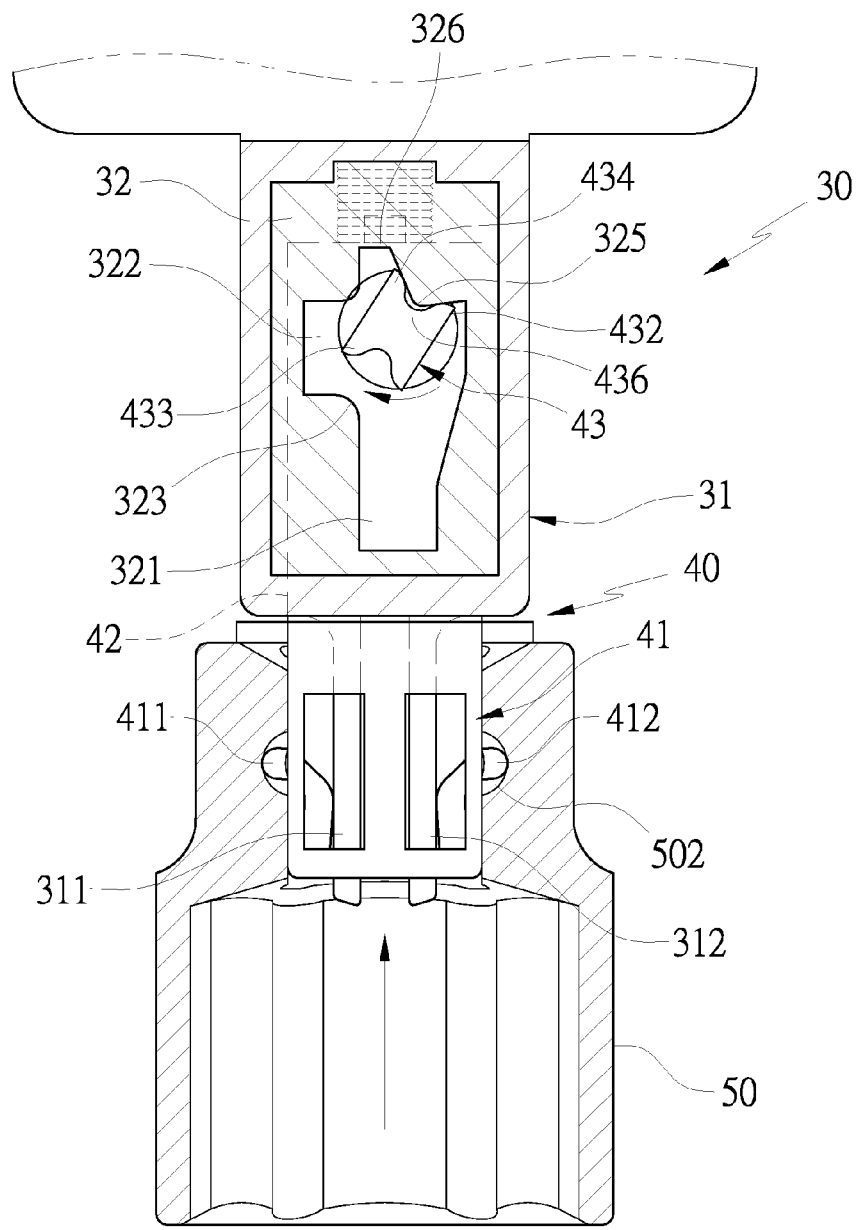
Figure 11:
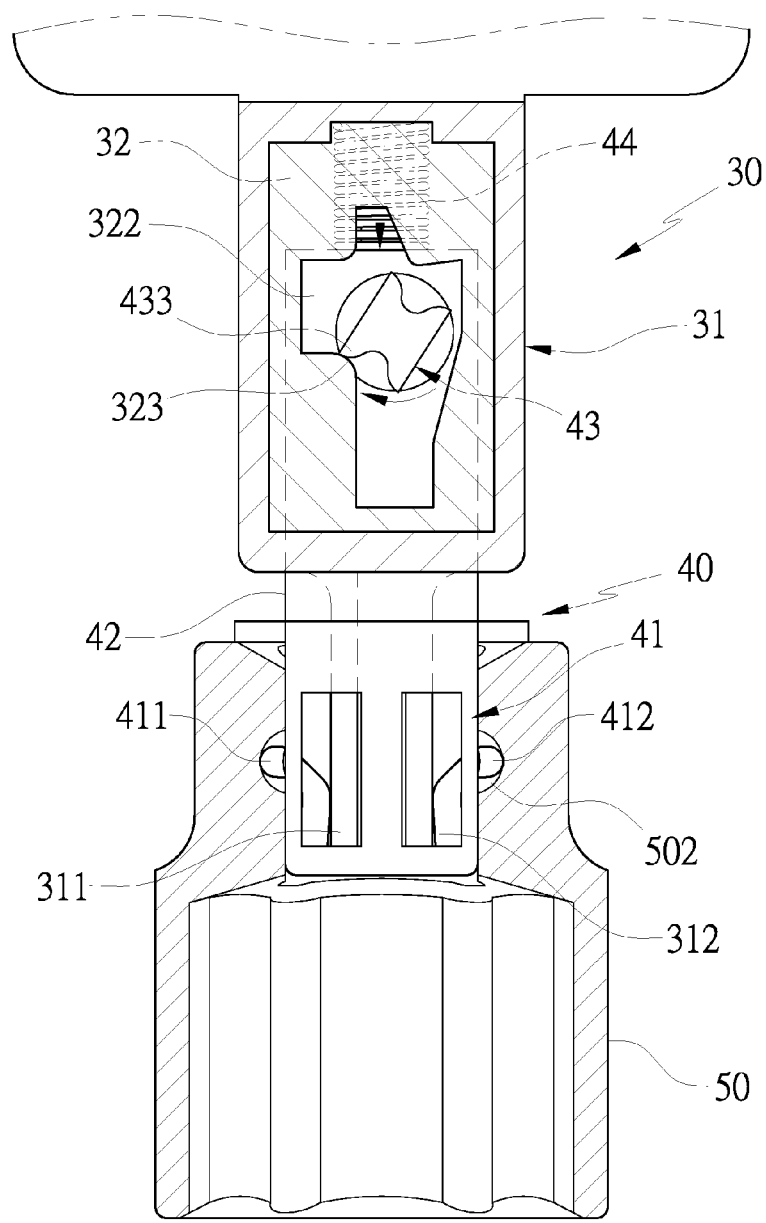
Figure 12:
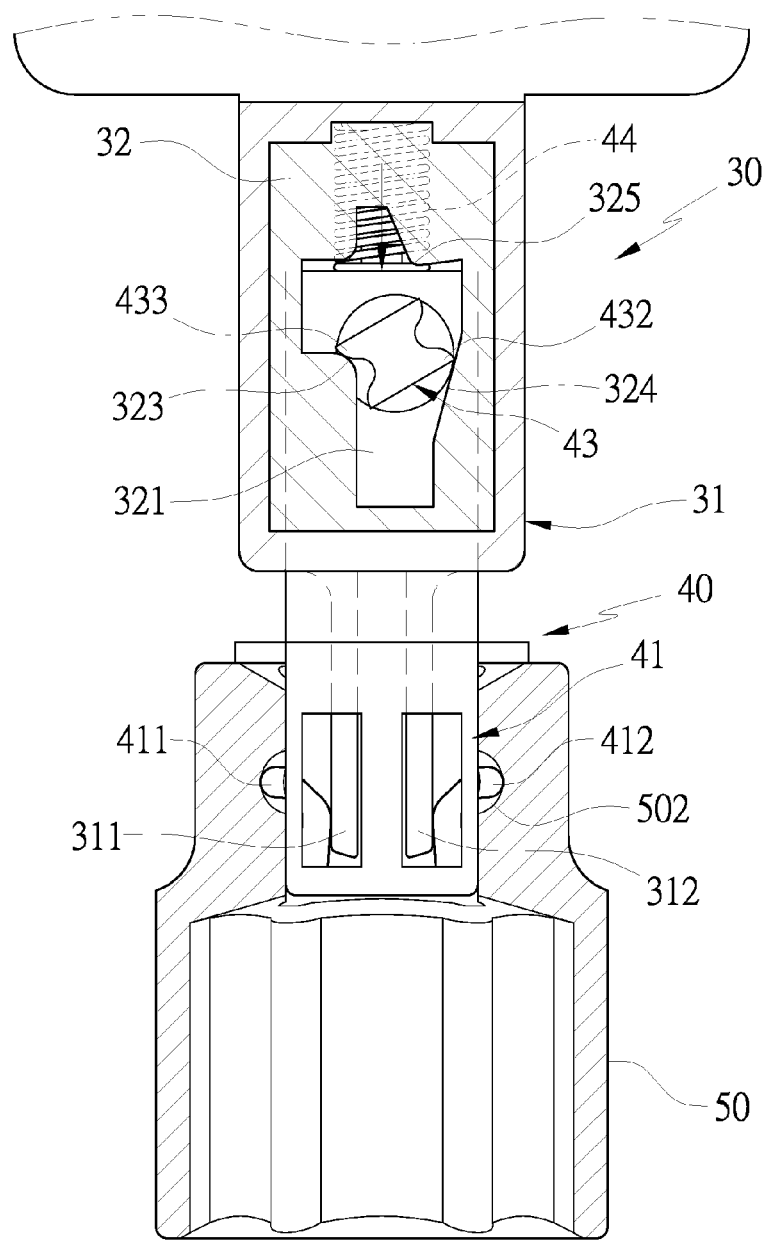

As shown in FIG. 8, the tool 50 is the socket and is fitted with the holding device which comprises the hanging plate 33a, wherein the tool 50 includes an aperture 501 defined on one end thereof, and the aperture 501 has a trench 502 formed therein, such that the aperture 501 of the tool 50 is fitted with the fitting seat 41 of the base 40. Referring further to FIG. 9, the tool 50 is pushed upwardly, and the base 40 moves toward the accommodating chamber 31 of the body 30 with the tool 50, such that the first locking tab 411 engages with the first stop extension 311, the second locking tab 412 engages with the second stop extension 312, and the first locking tab 411 and the second locking tab 412 retain in the trench 502 of the tool 50. Moreover, the driving insertion 42 of the base 40 pushes the resilient element 44 and drives the confining block 43 to move into the expansion section 322 from the limiting section 321, such that the first protrusion 432 of the confining block 43 contacts with the pushing projection 325 of the side lid 32. With reference to FIG. 10, after the first protrusion 432 of the confining block 43 contacts with the pushing projection 325 of the side lid 32, the pushing projection 325 pushes the first protrusion 432 of the confining block 43 so that the confining bock 43 rotates clockwisely, and the confining block 43 rotates in the expansion section 322 and further rotates at a larger angle by using the depression 326 and the first V-shaped recess 436, hence the second protrusion 433 of the confining block 43 rotates to correspond to the first shoulder 323, the first protrusion 432 and the third protrusion 434 of the confining block 43 contact with the pushing projection 325 of the side lid 32, thus stopping a movement of the tool 50 and the base 40. Referring to FIG. 11, as stopping the movement of the tool 50 and the base 40 and releasing the tool 50, i.e., the resilient element 44 pushes the driving insertion 42 of the base 40 downwardly to drive the base 40 to move downwardly, such that the driving insertion 42 drives the confining block 43 to move in the expansion section 322 of the side lid 32, and the second protrusion 433 of the confining block 43 contacts with the first shoulder 323 of the side lid 32. As shown in FIG. 12, the resilient element 44 keeps pushing the tool 50 downwardly, the first shoulder 323 of the side lid 32 pushes the second protrusion 433 of the confining block 43, thus rotating the confining block 43. Thereafter, the first protrusion 432 of the confining block 43 abuts against the second shoulder 324 of the side lid 32, and the first protrusion 432 and the second protrusion 433 of the confining block 43 are biased against the first shoulder 323 and the second shoulder 324, such that the first stop extension 311 engages with the first locking tab 411, and the second stop extension 312 engages with the second locking tab 412, thus fitting the fitting seat 41 of the base 40 with the tool 50 easily.

Figure 13:
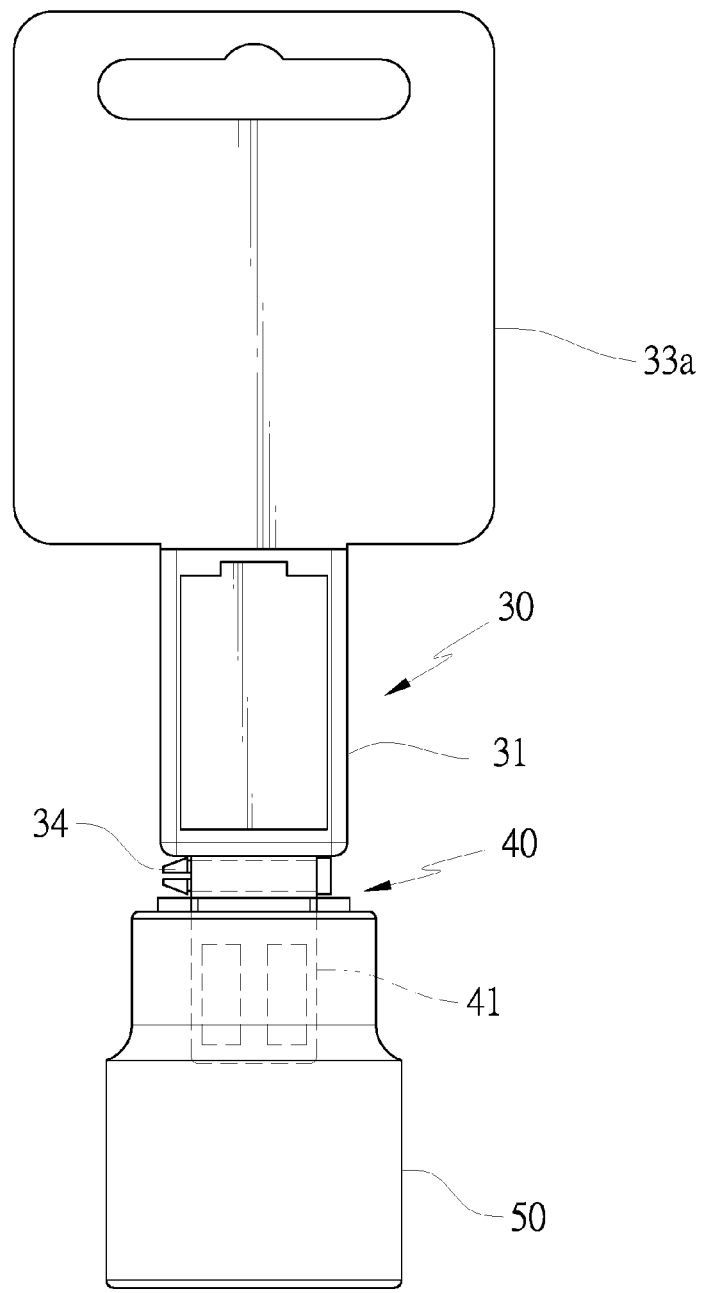
FIG. 13 is a side plan view showing the application of the holding device for the tool according to the preferred embodiment of the present invention.

As shown in FIG. 13, after the tool 50 is fitted with the base 40, an anti-theft structure is fixed between the accommodating chamber 31 of the body 30 and the fitting seat 41 of the base 40 so that the base 40 is not pushed any more, thus avoiding removing the tool 50 from the base 40. In this embodiment, the anti-theft structure includes a gap defined between the accommodating chamber 31 of the body 30 and the fitting seat 41 of the base 40 to insert a fixing bolt 34, such that the base 40 is not pushed any more. Preferably, the tool 50 is hanged and displayed by using the hanging plate 33a. In another embodiment, the anti-theft structure includes a restricting band fitted between the accommodating chamber 31 of the body 30 and the fitting seat 41 of the base 40 to obtain anti-theft purpose.

Figure 14:
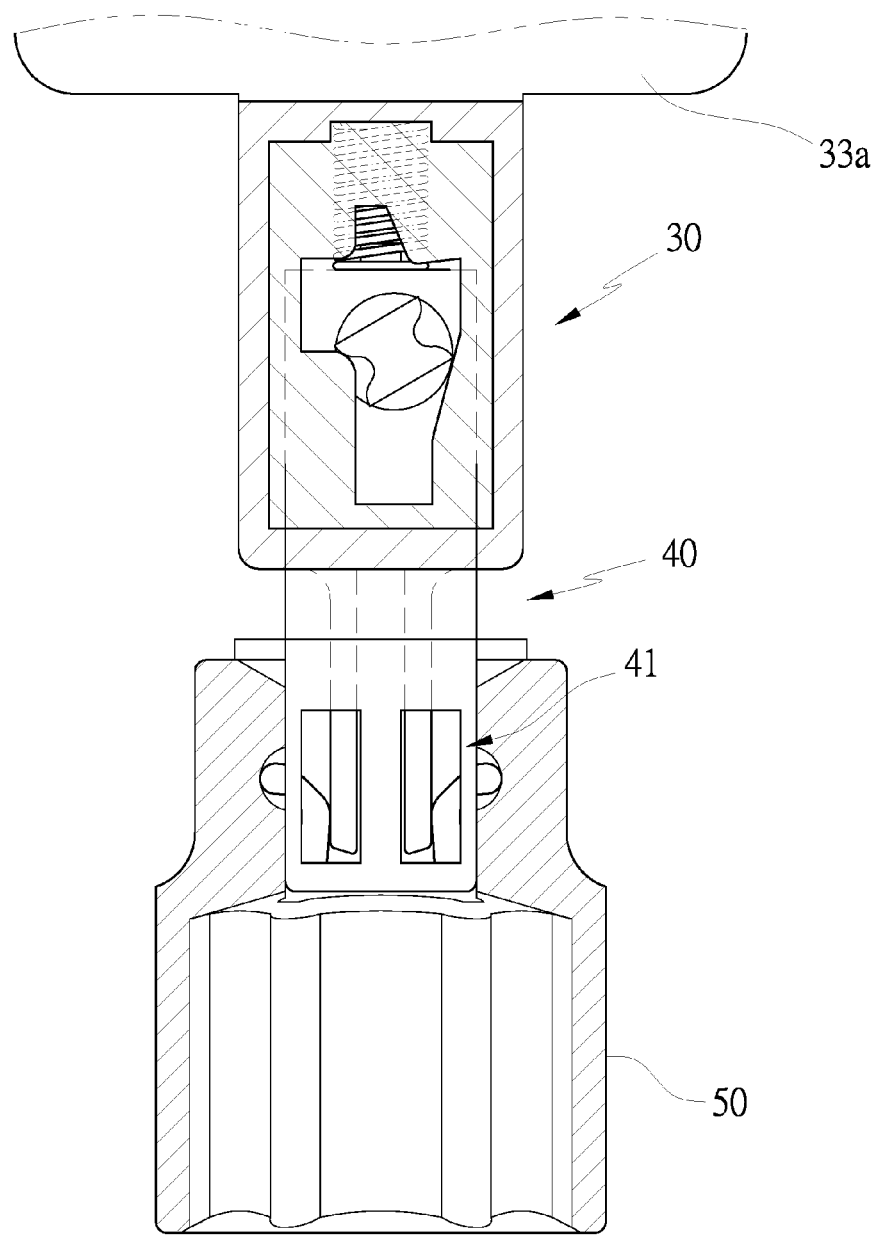
FIGS. 14 to 19 are another cross sectional view showing the operation of the holding device for the tool according to the preferred embodiment of the present invention.
Figure 15:
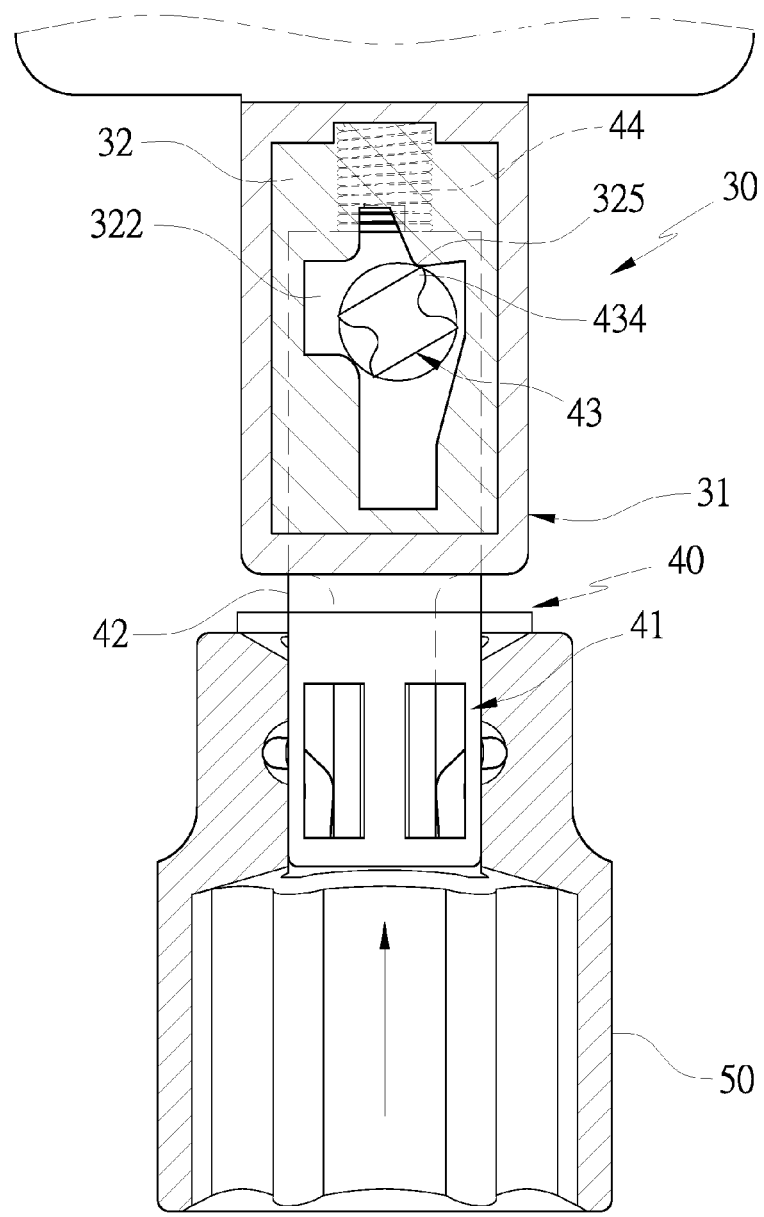
Figure 16:
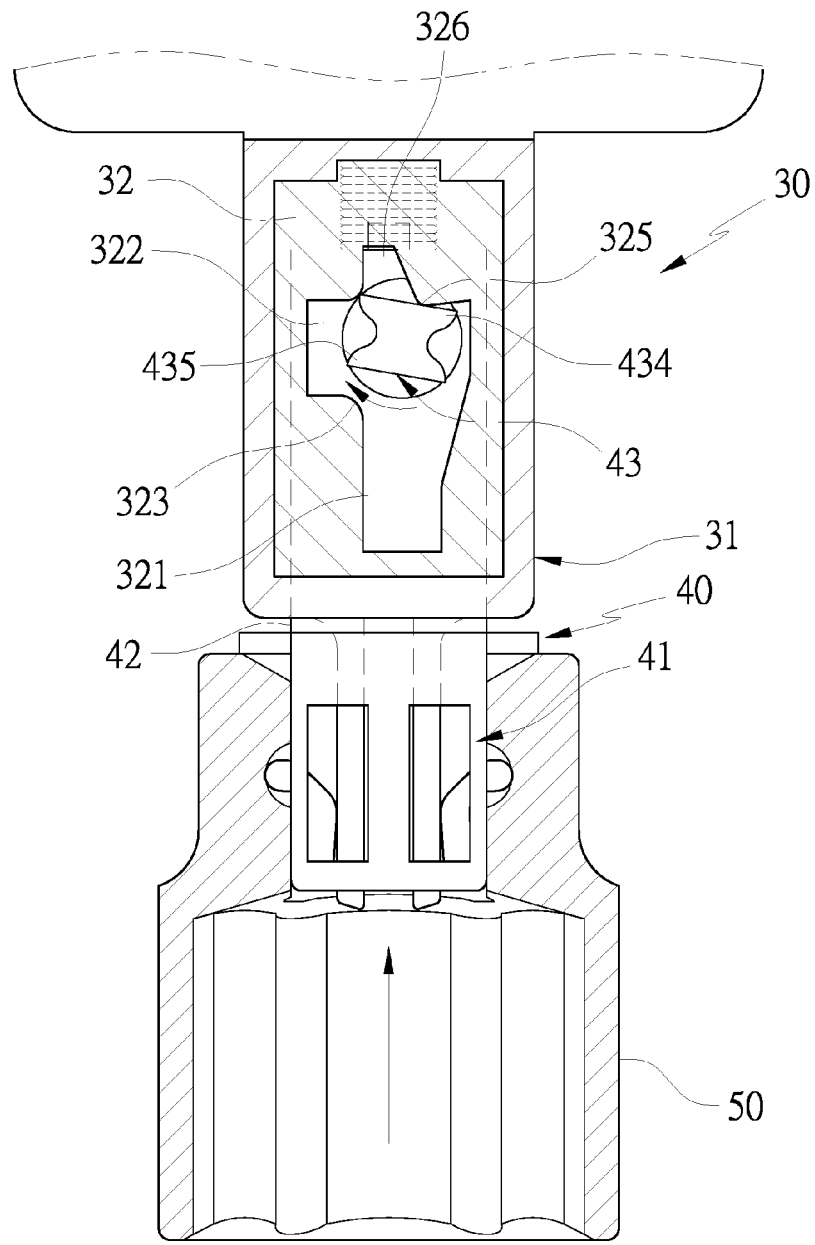
Figure 17:
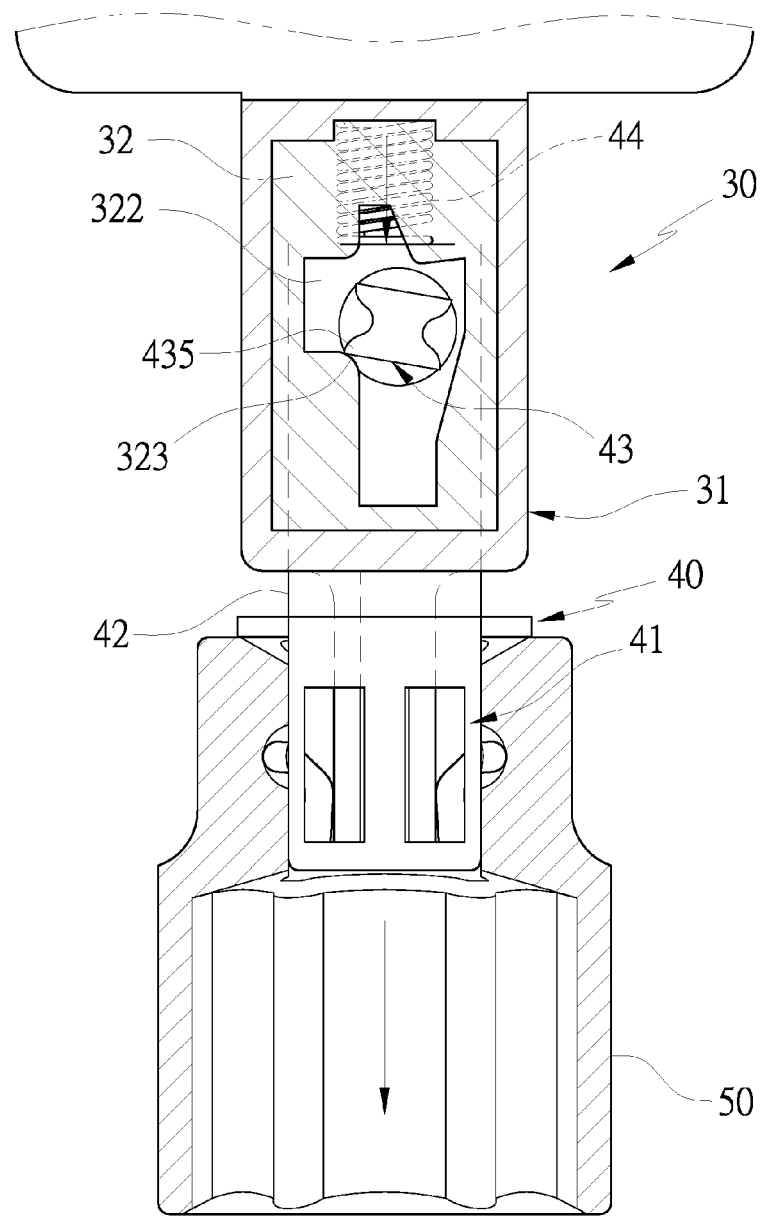
Figure 18:
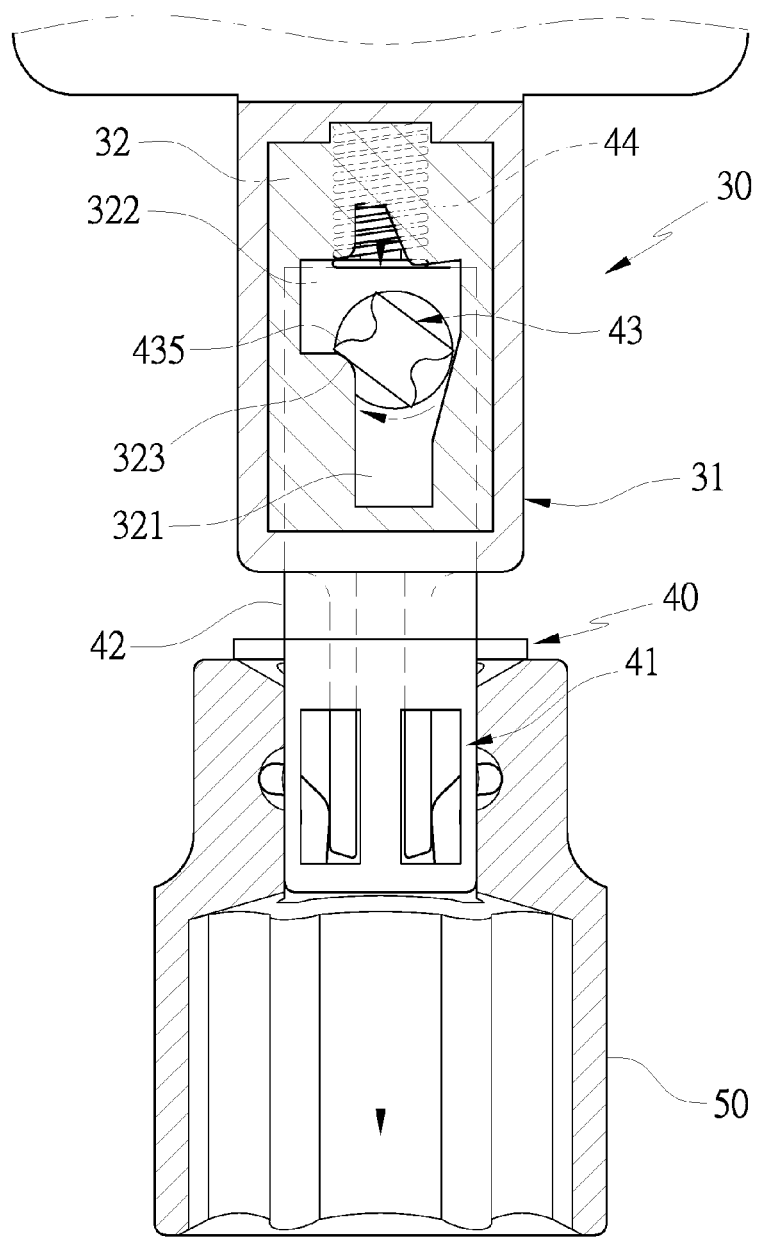
Figure 19:
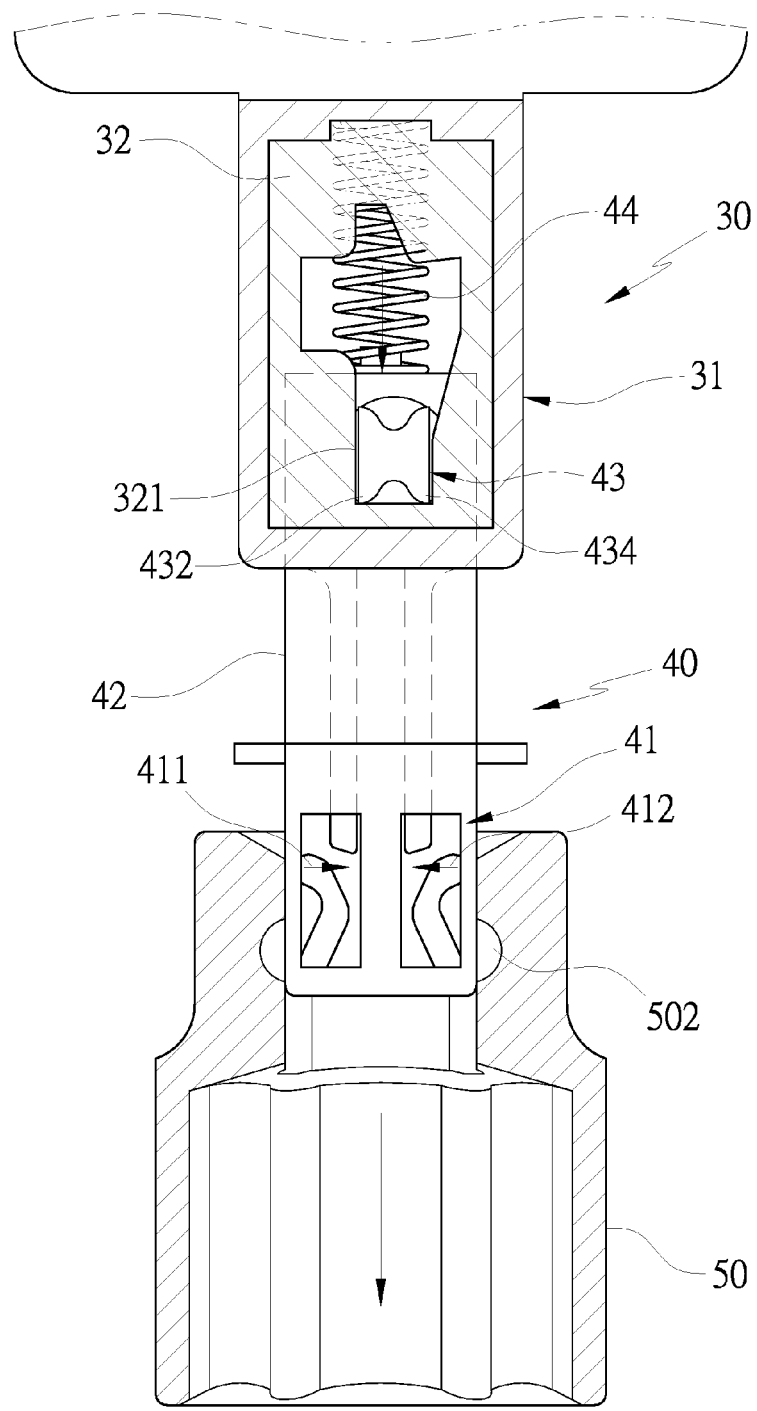

As illustrated in FIG. 14, after purchasing the tool 50, the anti-theft structure is removed, and the hanging plate 33a is stored. With reference to FIG. 15, the tool 50 is pushed upwardly by user's one hand, and the base 40 moves toward the accommodating chamber 31 of the body 30 with the tool 50, the driving insertion 42 of the base 40 pushes the resilient element 44 and drives the confining block 43 to move into the expansion section 322 of the side lid 32, such that the third protrusion 434 of the confining block 43 contacts with the pushing projection 325 of the side lid 32. With reference to FIG. 16, after the third protrusion 434 of the confining block 43 contacts with the pushing projection 325 of the side lid 32, the pushing projection 325 pushes the third protrusion 434 of the confining block 43, such that the confining block 43 rotates clockwisely, and the confining block 43 rotates in the expansion section 322 of the side lid 32. Preferably, the confining block 43 further rotates at the larger angle by using the depression 326 of the side lid 32, hence the fourth protrusion 435 of the confining block 43 rotates and corresponds to the first shoulder 323, and the pushing projection 325 of the side lid 32 stops the movement of the tool 50 and the base 40. Referring to FIG. 17, the tool 50 is pulled downwardly, and the resilient element 44 pushes the driving insertion 42 of the base 40 to move downwardly, thus moving the base 40 downwardly. Thereafter, the driving insertion 42 of the base 40 drives the confining block 43 to move in the expansion section 322 of the side lid 32, and the fourth protrusion 435 of the confining block 43 contacts with the first shoulder 323 of the side lid 32. As shown in FIG. 18, the tool 50 is pulled downward continuously, and the resilient element 44 pushes the driving insertion 42 downwardly, such that the first shoulder 323 of the side lid 32 abuts against the fourth protrusion 435 of the confining block 43, thus rotating the confining block 43. As illustrated in FIG. 19, when the tool 50 is pulled downward continuously, the resilient element 44 pushes the driving insertion 42 of the base 40 downwardly, and the first shoulder 323 of the side lid 32 guides the confining block 43 to move into the limiting section 321 of the side lid 32, the first protrusion 432 and the third protrusion 434 of the confining block 43 engage with the limiting section 321 of the side lid 32, such that the first locking tab 411 of the fitting seat 41 disengages from the first stop extension 311 of the body 30, the second locking tab 412 disengages from the second stop extension 312 of the body 30. Thereafter, the fitting seat 41 of the base 40 is removed from the tool 50, thus taking the tool 50 easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A holding device for a tool comprising:
a body including an accommodating chamber defined therein, a side lid for covering the accommodating chamber, and at least one stop extension extend outwardly from a bottom end of the body;
a base including a fitting seat, at least one locking tab disposed on two sides of the fitting seat and movably corresponding to the at least one stop extension of the body, and a driving insertion arranged on a top end of the fitting seat and inserting into the accommodating chamber of the body;
a limiting mechanism including a confining block connecting with the driving insertion of the base, and the limiting mechanism also including a limitation groove defined on the side lid of the body so that the confining block moves and rotates in the limitation groove, wherein the limitation groove has a limiting section formed therein so that the confining block moves in the limiting section, the limitation groove also has an expansion section formed on an open segment of the limiting section so that the confining block rotates in the expansion section and retains with the open segment of the limiting section, the at least one stop extension of the body engages with the at least one locking tab of the fitting seat of the base or the confining block rotates in the expansion section and moves into the limiting section, hence the at least one stop extension of the body disengages from the at least one locking tab of the fitting seat of the base.

2. The holding device for the tool as claimed in claim 1, wherein the accommodating chamber of the body has an opening formed on one side of the body, and the side lid of the body is covered the opening of the accommodating chamber.

3. The holding device for the tool as claimed in claim 1, wherein the body includes a first stop extension and a second stop extension which both extend outwardly from the bottom end of the body, the base includes a first locking tab disposed on a first side of the fitting seat and movably corresponding to the first stop extension, and the base also includes a second locking tab mounted on a second side of the fitting seat and movably corresponding to the second stop extension.

4. The holding device for the tool as claimed in claim 1, wherein the accommodating chamber of the body has a notch formed on a bottom end thereof so that the driving insertion of the base inserts into the accommodating chamber via the notch, the base also includes two slots formed above the fitting seat to insert the first stop extension and the second stop extension of the body.

5. The holding device for the tool as claimed in claim 1, wherein between a top end of the accommodating chamber of the body and a top end of the driving insertion is defined a resilient element.

6. The holding device for the tool as claimed in claim 1, wherein the confining block of the limiting mechanism is rectangular and has a first protrusion and a second protrusion which are arranged on a first diagonal position of the confining block, and the confining block also has a third protrusion and a fourth protrusion which are arranged on a second diagonal position of the confining block.

7. The holding device for the tool as claimed in claim 6, wherein between the first protrusion and the third protrusion of the confining block of the limiting mechanism is defined a first V-shaped recess, and between the second protrusion and the fourth protrusion of the confining block of the limiting mechanism is defined a second V-shaped recess.

8. The holding device for the tool as claimed in claim 1, wherein the limiting section of the limitation groove of the limiting mechanism has a close segment arranged on a first end thereof and has the open segment arranged on a second end thereof, and wherein a width of the limiting section is less than a distance between a first protrusion and a second protrusion, the width of the limiting section is also less than a distance between a third protrusion and a fourth protrusion, on a corner of the expansion section and the limiting section is defined a first shoulder, and a second shoulder is arranged in the limitation groove opposite to the first shoulder and has a tilted face defined thereon.

9. The holding device for the tool as claimed in claim 1, wherein the limitation groove of the limiting mechanism also has a pushing projection arranged above the second shoulder; the limitation groove further has a depression defined between the pushing projection and the expansion section.

10. The holding device for the tool as claimed in claim 1, wherein between the accommodating chamber of the body and the fitting seat of the base is fixed an anti-theft structure, and the anti-theft structure includes a gap defined between the accommodating chamber of the body and the fitting seat of the base to insert a fixing bolt.

\* \* \* \* \*